(12) United States Patent
Mido et al.

(10) Patent No.: US 6,510,045 B2
(45) Date of Patent: Jan. 21, 2003

(54) SOLID ELECTROLYTE CAPACITOR

(75) Inventors: Yuji Mido, Higashiosaka (JP);
Tetsuhiro Korechika, Sakai (JP);
Suzushi Kimura, Toyonaka (JP);
Koichi Kojima, Hirakata (JP); Hideki Masumi, Kyoto (JP); Seiji Takagi, Neyagawa (JP)

(73) Assignee: Matsushita Electric Industrial Co., Ltd. (JP)

( * ) Notice: Subject to any disclaimer, the term of this patent is extended or adjusted under 35 U.S.C. 154(b) by 139 days.

(21) Appl. No.: 10/018,134

(22) PCT Filed: Apr. 19, 2001

(86) PCT No.: PCT/JP01/03341
§ 371 (c)(1),
(2), (4) Date: Jan. 29, 2002

(87) PCT Pub. No.: WO01/82319
PCT Pub. Date: Nov. 1, 2001

(65) Prior Publication Data
US 2002/0159223 A1 Oct. 31, 2002

(30) Foreign Application Priority Data
Apr. 20, 2000 (JP) .................................... 2000-118989

(51) Int. Cl.$^7$ .............................................. H01G 9/042
(52) U.S. Cl. ....................................... 361/529; 361/523
(58) Field of Search .............................. 361/523–541

(56) References Cited

U.S. PATENT DOCUMENTS 4,231,075 A * 10/1980 Morimoto et al. .......... 361/540

FOREIGN PATENT DOCUMENTS

| JP | 46-35298 | 10/1971 |
|----|----------|---------|
| JP | 52-27547 | 3/1977 |
| JP | 10-74668 | 3/1998 |

* cited by examiner

*Primary Examiner*—Dean A. Reichard
*Assistant Examiner*—Eric Thomas
(74) *Attorney, Agent, or Firm*—Parkhurst & Wendel, L.L.P.

(57) ABSTRACT

A solid electrolytic capacitor of the present invention includes a sheet of valve metal, of which a part constitutes an positive electrode, a dielectric layer formed on a surface of the valve metal, a solid electrolyte layer formed on the dielectric layer, a negative electrode formed on the solid electrolyte layer, and an insulating protective layer for protecting the positive electrode, the dielectric layer, the solid electrolyte layer and the negative electrode. It is further provided with a bump formed on the insulating protective layer and connected to at least one of the positive electrode and the negative electrode. The solid electrolytic capacitor of the present invention is useful to constitute a semiconductor device or a circuit having outstanding high frequency response.

15 Claims, 8 Drawing Sheets

SOLID ELECTROLYTE CAPACITOR

FIELD OF THE INVENTION

The present invention relates to solid electrolytic capacitors used in a variety of electronic devices, and particularly to those on which semiconductor devices can be directly mounted.

BACKGROUND OF THE INVENTION

A solid electrolytic capacitor of the prior art comprises a dielectric oxide layer formed on a surface of a positive electrode device consisting of a sheet of valve metal such as aluminum or tantalum, a solid electrolyte layer such as functional polymer and manganese dioxide disposed on the oxide layer, and a negative electrode layer disposed on an outer surface of the solid electrolyte layer. All of them are molded entirely thereafter by an outer molding resin, and terminal electrodes are disposed to both ends of the outer molding resin.

The above-described solid electrolytic capacitor of the prior art is a one-chip type component similar to a resistor and inductance component that is mounted on a circuit board when being used.

However, although there has been a demand for electronic components having good high frequency response according to a digitization of circuits in these days, the conventional solid electrolytic capacitors of the above kind that are surface-mounted on a circuit board together with semiconductor devices had a problem that they lower the high frequency response of the circuits.

The present invention is intended to eliminate the above problem of the prior art, and to provide solid electrolytic capacitors that can be directly bump-connected with semiconductor devices, and also has a superior high frequency response.

SUMMARY OF THE INVENTION

A solid electrolytic capacitor of the present invention comprises:

- a positive electrode disposed on one side of a sheet of valve metal having a dielectric layer formed on its surfaces as well as surfaces of internal pores;
- a solid electrolyte layer and a negative electrode layer disposed on the dielectric layer of valve metal;
- an insulating protective layer provided on their exterior surfaces, at least one surface of this insulating protective layer is provided with a via hole extending to the positive electrode and the negative electrode layer;
- a conductor connected electrically to one of the electrodes but insulated from the other provided in the via hole; and
- a connecting bump disposed on the conductor exposed on the insulating protective layer for connection with a semiconductor device, a chip component, and the like.

By using the solid electrolytic capacitor of present invention, a variety of chip components including semiconductor devices can be mounted to the connecting bumps on the surface of the solid electrolytic capacitor, and a semiconductor device or a circuit having an outstanding high frequency response can be obtained.

THE BEST MODES FOR CARRYING OUT THE INVENTION

A solid electrolytic capacitor of the present invention will be described hereinafter with reference to FIG. 1 through FIG. 15.

Figure 1:
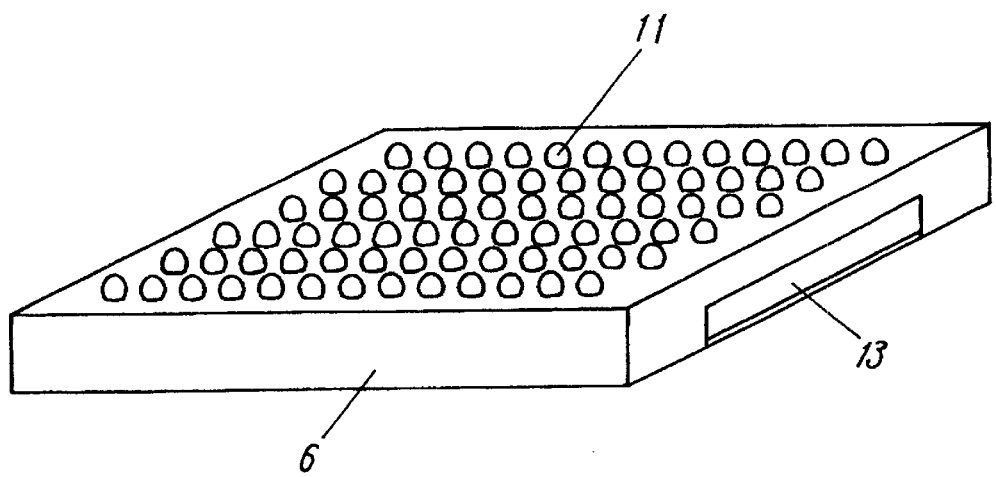
FIG. 1 is a perspective view of a solid electrolytic capacitor according to an exemplary embodiment of the present invention.
Figure 2:
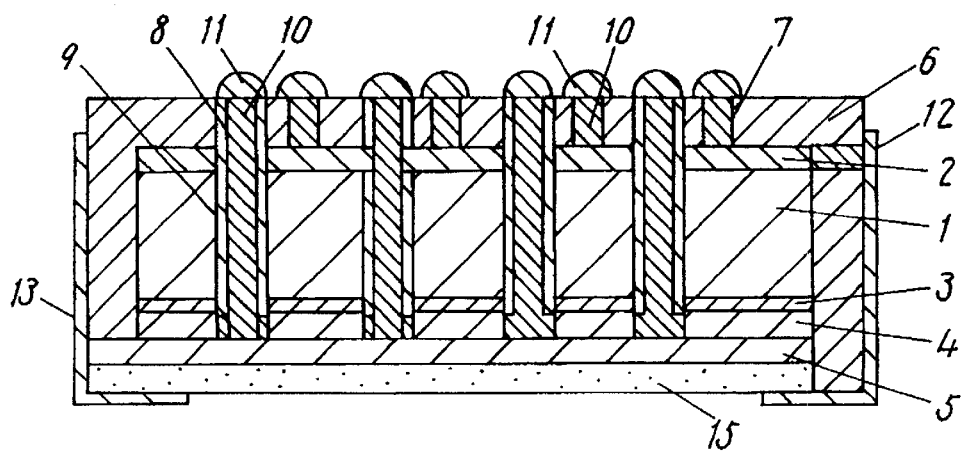
FIG. 2 is a sectional view of the same.

FIG. 1 is a perspective view of a solid electrolytic capacitor according to one exemplary embodiment of this invention, and FIG. 2 is a sectional view of the same solid electrolytic capacitor.

In FIG. 1 and FIG. 2, sheet 1 of valve metal such as aluminum foil or sintered body of valve metal powder such as tantalum, of which one surface is etched, is provided with positive electrode 2 on that surface. If the sheet is made of aluminum foil, an unetched surface of it may be used as the positive electrode 2, or another metal layer composed of gold, copper, nickel, arid the like may be formed on it. If the sheet is sintered body of valve metal powder, one surface of the sintered body, on which a dielectric layer is not formed, may be used as is. Or, a metal layer of gold, copper, nickel, tantalum, and the like may be formed by such a method as sputtering, vacuum deposition, and the like.

In addition, the sheet 1 is anodized to form dielectric layer 3 on surfaces of the sheet as well as surfaces of internal pores, with an exception of the positive electrode 2. Solid electrolyte layer 4 is also formed on the dielectric layer 3. The solid electrolyte layer 4 can be formed by such means as chemical polymerization and electrolytic polymerization of electro-conductive polymer such as polypyrrole, polythiophene, and the like, or by forming a manganese dioxide layer by impregnating the sheet with manganese nitrate solution, followed by thermal decomposition.

Negative electrode layer 5 is formed on the solid electrolyte layer 4. The negative electrode layer 5 may be formed by bonding a metallic foil such as copper, or by coating electrically conductive paste on the solid electrolyte layer 4.

Insulating protective layer 6 for covering them entirely is formed by such means as molding, coating, and dipping using epoxy resin, for instance, or the like.

Via holes 7 are provided in one side of the insulating protective layer 6 on the positive electrode 2, and via holes 8 are provided through the insulating protective layer 6, positive electrode 2, valve metal sheet 1, dielectric layer 3, and solid electrolyte layer 4. The via holes 7 and 8 are formed by laser beam irradiation, etching, punching, or the like process.

Insulating layer 9 is formed on every inner wall of the via holes 8. Conductors 10 are formed in the via holes 7 and 8 by copper plating or the like. The conductors 10 in the via holes 7 and the conductors 10 in the via holes 8 are electrically connected to the positive electrode 2 and the negative electrode layer 5 respectively.

There are connecting bumps 11 formed of solder, gold, tin, silver, and the like on top of the conductors 10 on a surface of the sheet. A number of the connecting bumps 11 to be formed and their pitches are the same as the number and pitch of connecting bumps of a semiconductor device to be mounted afterward, or the former number may be larger than the latter number. The reason of forming the larger number of connecting bumps 11 than that of the connecting bumps of the semiconductor device is to make it possible to mount chip components such as chip resistors, chip ceramic capacitors, as well as chip inductors and the like between the remaining connecting bumps 11, after the semiconductor device is mounted.

In addition, terminals 12 and 13 connected respectively with the positive electrode 2 and the negative electrode layer 5 are formed on side surfaces and a bottom surface of the insulating protective layer 6.

Thus, a semiconductor device produced in this manner by mounting a semiconductor and the like device directly on one surface of the solid electrolytic capacitor eliminates a pattern of wiring conductors on a circuit board, and thereby substantially improves the high frequency response of the semiconductor device.

Besides, if aluminum foil, one surface of which is etched, is used for the sheet 1, already established manufacturing facilities, production techniques, and know-how concerning aluminum foil for the aluminum electrolytic capacitors can effectively be used. That is, sheet 1 having the desired etched pits can be obtained readily only if one surface of the aluminum foil is masked and etched, so as to improve productivity of the solid electrolytic capacitors without making new investment on plant.

Furthermore, an electrostatic capacity of the solid electrolytic capacitor can be increased when sintered body of valve metal powder such as tantalum is used as the sheet 1.

Moreover, if one surface of the aluminum foil or sintered body of valve metal powder is used as positive electrode 2, another metal layer is not needed to serve as the positive electrode 2. This reduces the component parts and improves efficiency in production, thereby giving it an advantageous in terms of cost. However, it is preferable to form a metal layer of such as gold, copper, nickel and the like for use as the positive electrode 2 on a surface of the sheet 1 in order to improve a connection reliability between the conductors 10 formed in the via holes 7 and 8 and the positive electrode 2.

Also, a use of electro-conductive polymer such as polypyrrole and polythiophene as the solid electrolyte layer 4 makes it possible to obtain a solid electrolytic capacitor of low impedance, i.e., the solid electrolytic capacitor with outstanding high frequency response.

In addition, as the fully established technique, there is a method of forming manganese dioxide for use as the solid electrolyte layer 4. In the case of forming manganese dioxide, the accumulated technique of the prior art can be applied to produce a dense solid electrolyte layer. It also improves productivity as well as reliability because it is capable of controlling thickness of the solid electrolyte layer 4.

In the foregoing embodiment, although an example, in which the connecting bumps 11 are disposed only to one surface of the insulating protective layer 6 is described, the connecting bumps 11 may be formed on both surfaces of the sheet 1. In this case, the via holes 7 and 8 are so provided that they reach the negative electrode layer 5 and the positive electrode 2 respectively, each of the via holes 8 are provided with insulating layer 9, and conductors 10 are formed in them by plating. The above structure provides a solid electrolytic capacitor with connecting bumps 11 on both surfaces.

In addition, although the above-described embodiment is an example having the terminals 12 and 13 formed thereon, the terminals 12 and 13 are not always necessary. The connecting bumps 11 can be used as substitutes for the terminals 12 and 13. Further, it is also possible to use a semiconductor device and chip component mounted on the connecting bumps 11 as substitutes for the terminals.

Referring now to FIG. 3 through FIG. 14, one example of a method of manufacturing solid electrolytic capacitors of the present invention will be described hereinafter.

Figure 3:
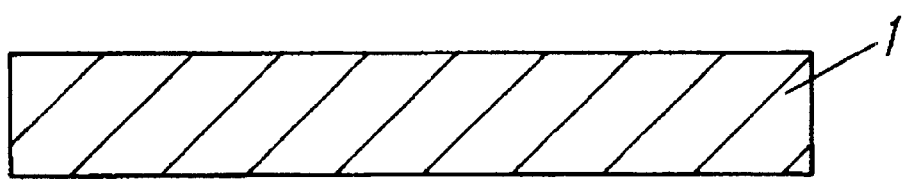
FIG. 3 is a sectional view of a sheet of valve metal used for the solid electrolytic capacitor.

First, an aluminum foil, of which one surface is etched, is prepared as the sheet 1, as shown in FIG. 3. This aluminum foil can be obtained readily by masking one of the foil surfaces and subjecting it to etching process.

Figure 4:
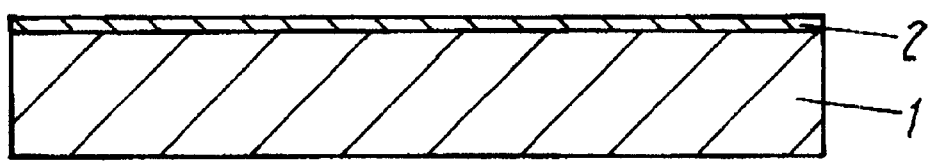
FIG. 4 is a sectional view of the sheet of valve metal having a positive electrode formed on it.

Next, positive electrode 2 consisting of copper is formed on unetched surface of the sheet 1, as shown in FIG. 4. This positive electrode 2 can be formed by sputtering, vacuum deposition, or bonding a copper foil.

Figure 5:
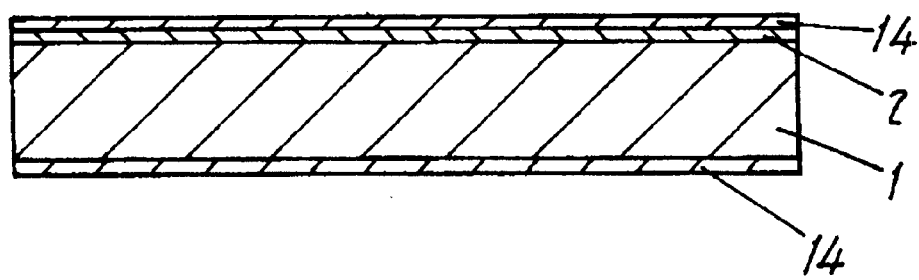
FIG. 5 is a sectional view of the sheet of valve metal with resist layers formed on both surfaces thereof.
Figure 6:
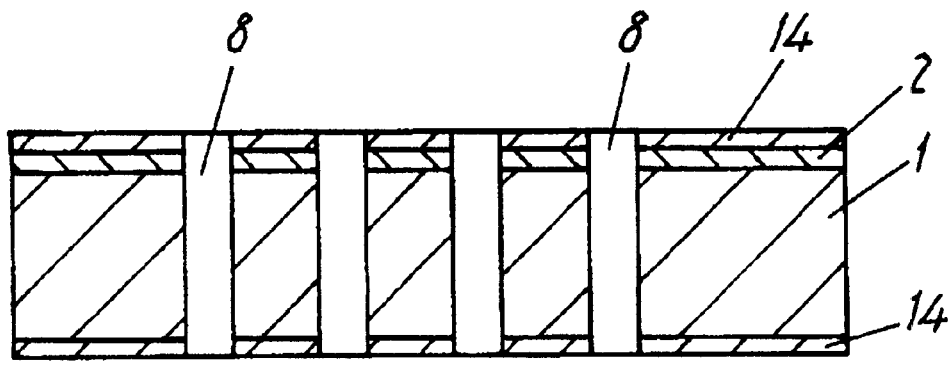
FIG. 6 is a sectional view of the sheet of valve metal having via holes formed in it.
Figure 7:
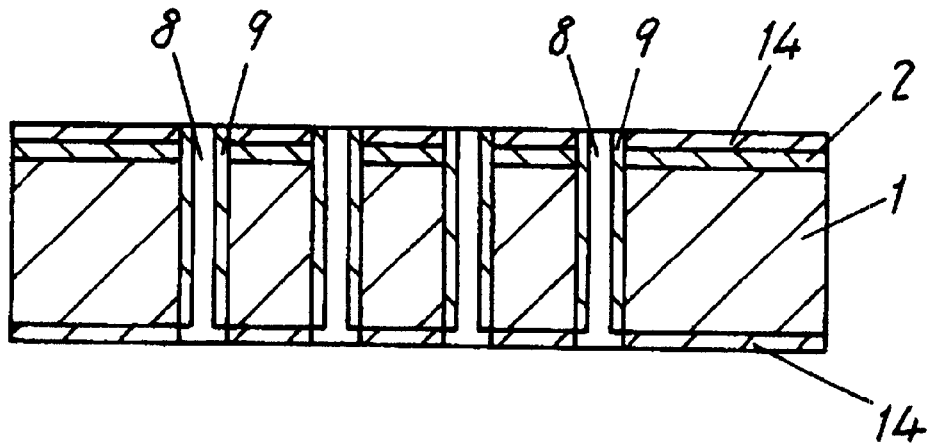
FIG. 7 is another sectional view with insulating layers formed in the via holes.

Then, resist layer 14 of photoresist or masking tape having a resistance to chemicals is formed on both surfaces as shown in FIG. 5. After the resist layer 14 is cured, a required number of via holes 8 are formed by punching in required places, as shown in FIG. 6. Thereafter, insulating layers 9 are formed on inner walls of the via holes 8 by an electrodeposition of resin, as shown in FIG. 7.

Figure 8:
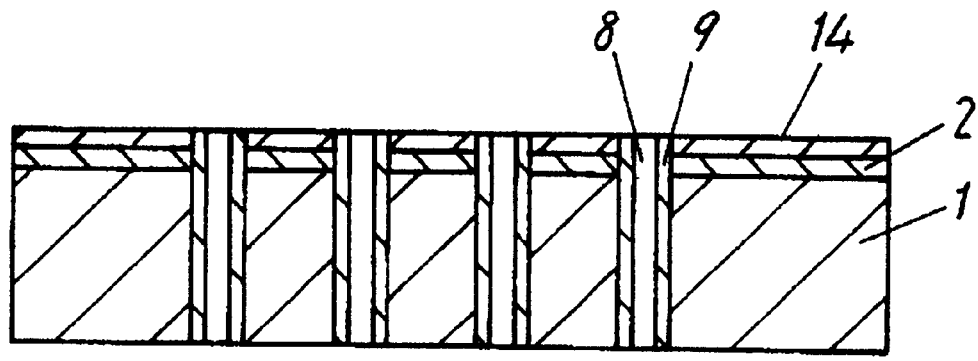
FIG. 8 is a sectional view of the sheet of valve metal with a resist layer removed from one of its surfaces.
Figure 9:
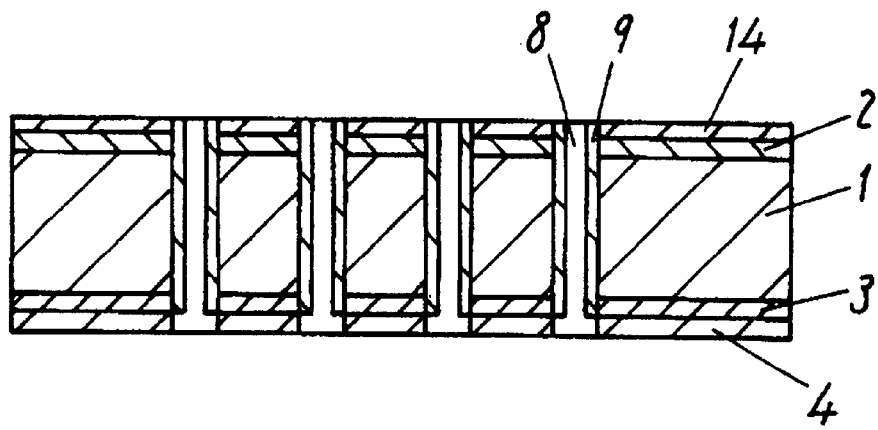
FIG. 9 is a sectional view of the sheet of valve metal having a dielectric oxide layer and a solid electrolyte layer formed thereon.

Following the above, resist layer 14 on a surface opposite the positive electrode 2 is stripped off or removed by dissolving, to expose the surface of the porous sheet 1, as shown in FIG. 8. It is then anodized in anodizing solution to form dielectric layer 3 on the surface of the sheet as well as surfaces of internal pores, as shown in FIG. 9. The sheet with the oxidized dielectric layer 3 formed thereon is immersed in solution containing pyrrole, and successively into another solution of oxidizer, to form a thin polypyrrole layer on the dielectric layer 3 by chemical oxidation polymerization. The sheet having the polypyrrole layer formed is immersed in the solution containing pyrrole, and electrolytic polymerization is carried out as the polypyrrole layer and an electrode in the solution as being positive and negative respectively. This produces another polypyrrole layer of sufficient thickness on the polypyrrole layer described above, to form the solid electrolyte layer 4.

Figure 10:
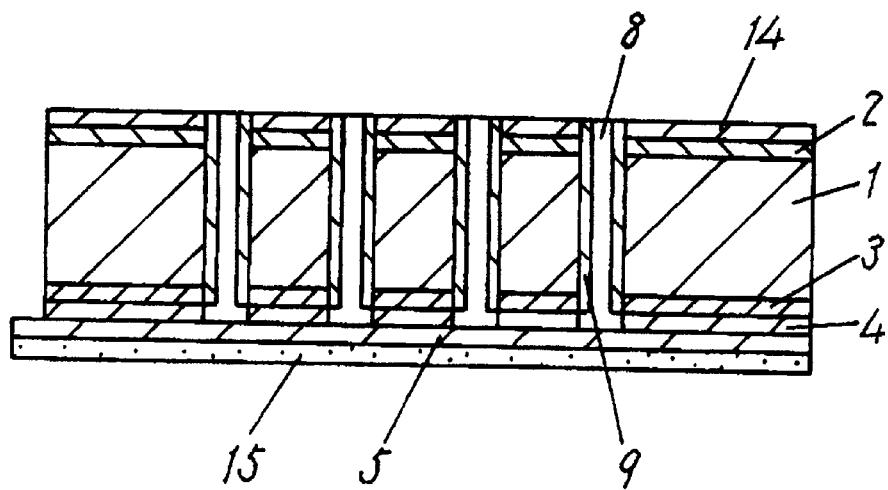
FIG. 10 is a sectional view of the sheet of valve metal having a negative electrode layer formed on it.
Figure 11:
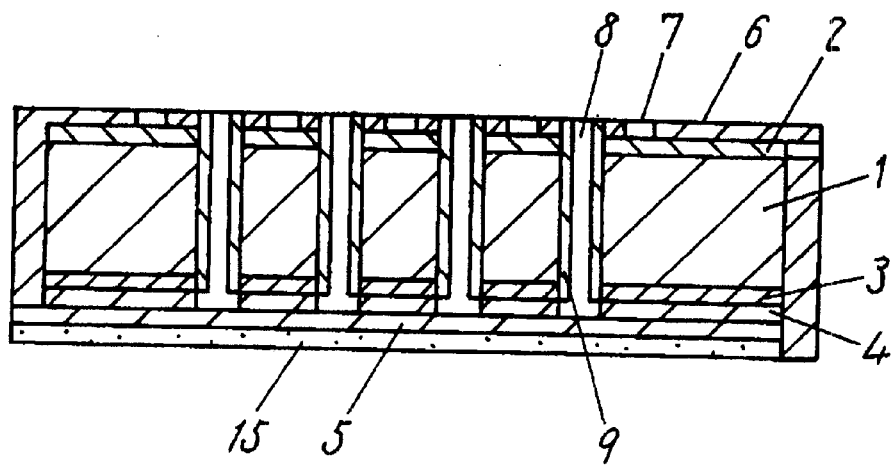
FIG. 11 is a sectional view of the sheet of valve metal having an insulating protective layer formed on it.

Thereafter, resin sheet 15 having negative electrode layer 5 of copper formed on one of its surfaces is bonded in such a manner that this metal negative electrode layer 5 is electrically in contact with the solid electrolyte layer 4, as shown in FIG. 10. Subsequently, via holes 7 are formed in predetermined locations at the side adjoining the positive electrode 2, as shown in FIG. 11. At the same time, insulating protective layer 6 consisting of epoxy resin or the like is formed on it, including a side surface, with openings being in communication to the surface of the positive electrode 2.

Figure 12:
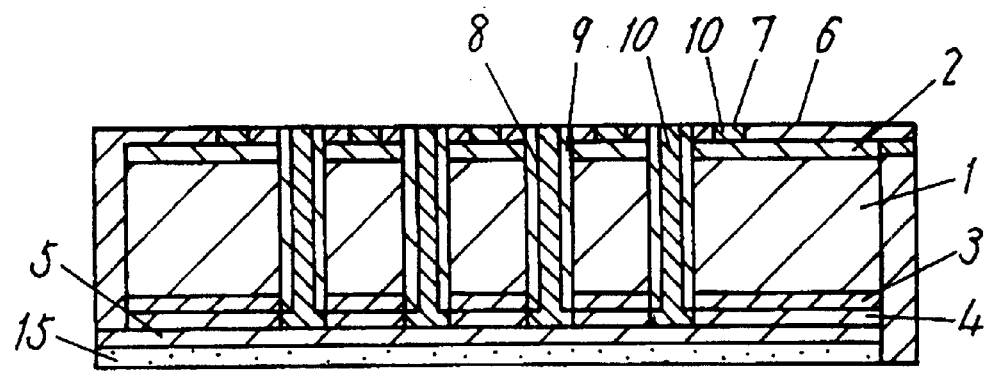
FIG. 12 is a sectional view of the sheet of valve metal with conductors formed in the via holes.

Conductors 10 are then formed in the via holes 7 and 8, and in the openings by plating copper or the like on their inner surfaces, as shown in FIG. 12. In this process, the conductors 10 in the via holes 7 and the conductors 10 in the via holes 8 are so formed that they are electrically in contact with the positive electrode 2 and the negative electrode layer 5 respectively.

Figure 13:
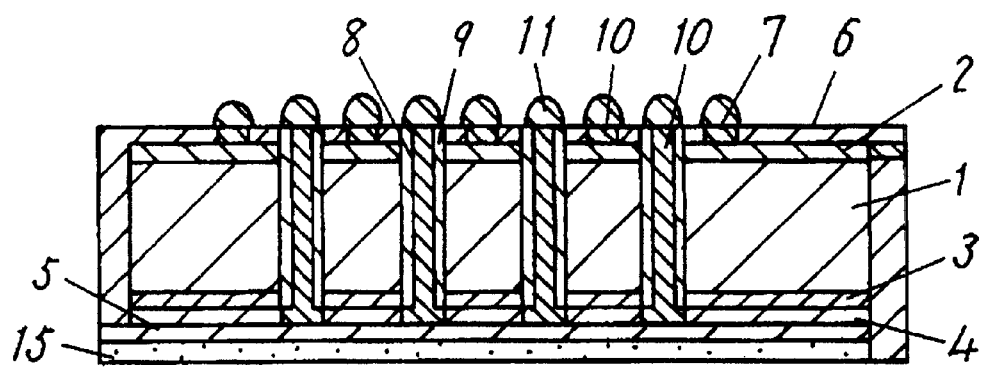
FIG. 13 is a sectional view of the sheet of valve metal with connecting bumps formed on the conductors.
Figure 14:
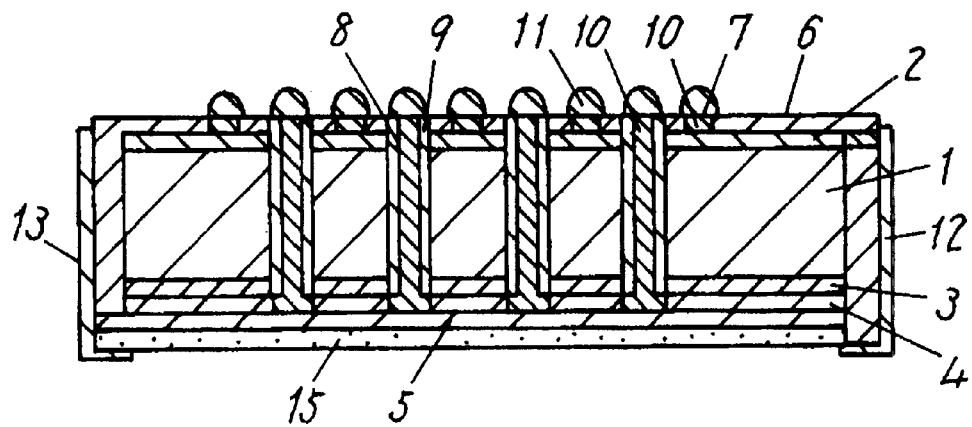
FIG. 14 is a sectional view of the same with terminals formed on it.

Finally, connecting bumps 11 are formed with solder, gold, tin, or silver on the conductors 10 exposed above the insulating protective layer 6, as shown in FIG. 13. Further, terminals 12 and 13 to be connected with the positive electrode 2 and the negative electrode layer 5 respectively are formed on side surfaces and bottom surface, as shown in FIG. 14, to complete the solid electrolytic capacitor.

Figure 15:
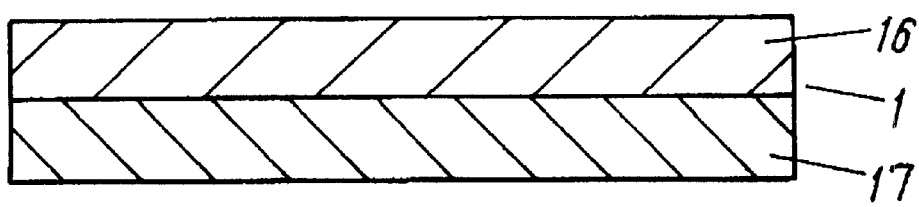
FIG. 15 is a sectional view showing another sheet of valve metal.

In addition, when tantalum foil 16 and sintered body of valve metal powder are used for the sheet, as another example, sintered body 17 of tantalum is bonded to one side of the tantalum foil 16, as shown in FIG. 15, to construct the sheet 1.

A solid electrolytic capacitor is then produced following the same process as in the case of the foregoing embodiment that uses aluminum foil.

The solid electrolytic capacitor of the present invention, because of the above structure, is able to compose a semiconductor device by connecting a semiconductor directly on a surface of the solid electrolytic capacitor where the connecting bumps are formed. Since this can constitute an electric circuit, or the semiconductor device having considerably superior high frequency response, it can become a useful device in constructing a digital circuit. Accordingly, the solid electrolytic capacitor of this invention is quite suitable for use in a digital circuit that requires a high-speed response.

What is claimed is:

1. A solid electrolytic capacitor comprising:
    a porous body of valve metal, parts of said porous body constituting a plurality of positive electrodes;
    a dielectric layer formed on a surface of said valve metal;
    a solid electrolyte layer formed on said dielectric layer;
    a plurality of cathode electrodes formed on said solid electrolyte layer; and
    an insulating protective layer for protecting said positive electrodes, said dielectric layer, said solid electrolyte layer, and said cathode electrodes,
    wherein said solid electrolytic capacitor has a plurality of bumps formed on said insulating protective layer, and connected to at least any of said positive electrodes and said cathode electrodes.

2. The solid electrolytic capacitor according to claim 1, wherein said porous body of valve metal is of a sheet form.

3. The solid electrolytic capacitor according to claim 1, wherein the connections between any of said positive electrodes and said negative electrodes and said bumps are made through conductors formed in via holes formed in any of said porous body of valve metal and said insulating protective layer.

4. The solid electrolytic capacitor according to claim 1, wherein said porous body of valve metal is a sintered body of valve metal powder.

5. The solid electrolytic capacitor according to claim 4, wherein parts of said sintered body where said dielectric layer is not formed constitute said positive electrodes.

6. The solid electrolytic capacitor according to claim 5 further comprising a metal layer formed on said positive electrodes.

7. The solid electrolytic capacitor according to claim 1, wherein said porous body of valve metal is an aluminum foil of which one surface is etched.

8. The solid electrolytic capacitor according to claim 7, wherein an unetched surface of said aluminum foil constitutes said positive electrodes.

9. The solid electrolytic capacitor according to claim 8 further comparing a metal layer formed on said unetched surface of said aluminum foil.

10. The solid electrolytic capacitor according to claim 1, wherein said solid electrolyte is an electro-conductive polymer.

11. The solid electrolytic capacitor according to claim 1, wherein said solid electrolyte is manganese dioxide.

12. The solid electrolytic capacitor according to claim 1, wherein a number of said bumps is larger than a number of connecting bumps of a semiconductor device to be connected to said solid electrolytic capacitor.

13. The solid electrolytic capacitor according to claim 1, wherein a plurality of solid electrolytic capacitors are formed on one said porous body of valve metal.

14. A solid electrolytic capacitor of unitary capacitor element structure comprising:
    a porous body of valve metal, parts of said porous body constituting a plurality of positive electrodes;
    a dielectric layer formed on a surface of said valve metal;
    a solid electrolyte layer formed on said dielectric layer;
    a plurality of negative electrodes formed on said solid electrolyte layer; and
    an insulating protective layer for protecting said positive electrodes, said dielectric layer, said solid electrolyte layer, and said negative electrodes,
    wherein said solid electrolytic capacitor has a plurality of bumps formed on said insulating protective layer, and connected to at least any of said positive electrodes and said negative electrodes.

15. A solid electrolytic capacitor comprising:
    a positive electrode disposed on one surface of a porous sheet of valve metal having an oxidized dielectric layer formed on a surface thereof as well as on surfaces of internal holes;
    a solid electrolyte layer and a negative electrode layer disposed on another surface of said porous sheet of valve metal;
    an insulating protective layer provided on an exterior surface of said positive electrode and said negative electrode;
    via holes provided in at least one of surfaces of said insulating protective layer, each of said via holes extending to one of said positive electrode and said negative electrode layer;
    conductors provided in said via holes, said conductors electrically connected to any of said electrodes individually but insulated from the other electrodes; and
    connecting bumps disposed on exposed surfaces of said conductors.

* * * * *

UNITED STATES PATENT AND TRADEMARK OFFICE
CERTIFICATE OF CORRECTION

PATENT NO. : 6,510,045 B2
DATED : January 21, 2003
INVENTOR(S) : Yuji Mido et al.

It is certified that error appears in the above-identified patent and that said Letters Patent is hereby corrected as shown below:

<u>Title page,</u>
Item [57], ABSTRACT,
Line 2, change "includes" to -- comprises --.

<u>Column 5,</u>
Lines 46, 51 and 55, change "cathode electrode" to -- negative electrode --.

Signed and Sealed this

Seventeenth Day of June, 2003

JAMES E. ROGAN
*Director of the United States Patent and Trademark Office*